(12) United States Patent
Strogov et al.

(10) Patent No.: US 11,640,460 B2
(45) Date of Patent: May 2, 2023

(54) SELF-PROTECTION OF ANTI-MALWARE TOOL AND CRITICAL SYSTEM RESOURCES PROTECTION

(71) Applicant: Acronis International GmbH, Schaffhausen (CH)

(72) Inventors: Vladimir Strogov, Moscow (RU);
Alexey Dod, Moscow (RU);
Vyacheslav Levchenko, Moscow (RU);
Nikolay Grebennikov, Moscow (RU);
Stanislav Protasov, Moscow (RU);
Serguei Beloussov, Costa del Sol (SG)

(73) Assignee: Acronis International GmbH, Schaffhausen (CH)

( * ) Notice: Subject to any disclaimer, the term of this patent is extended or adjusted under 35 U.S.C. 154(b) by 554 days.

(21) Appl. No.: 16/726,340

(22) Filed: Dec. 24, 2019

(65) Prior Publication Data
US 2020/0210568 A1 Jul. 2, 2020

Related U.S. Application Data

(60) Provisional application No. 62/784,930, filed on Dec. 26, 2018.

(51) Int. Cl.
*G06F 21/55* (2013.01)
*G06F 21/62* (2013.01)
*G06N 20/00* (2019.01)
*G06F 21/56* (2013.01)
*G06N 5/04* (2023.01)

(52) U.S. Cl.
CPC .......... *G06F 21/554* (2013.01); *G06F 21/568* (2013.01); *G06F 21/6218* (2013.01); *G06N 5/04* (2013.01); *G06N 20/00* (2019.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 2009/0300370 A1* | 12/2009 | Yao | ........................ | G06F 12/145 713/193 |
| 2010/0077481 A1* | 3/2010 | Polyakov | ............... | G06F 21/552 726/24 |
| 2010/0174919 A1* | 7/2010 | Ito | ........................... | G06F 21/74 713/192 |
| 2013/0139264 A1* | 5/2013 | Brinkley | .................. | G06F 21/54 726/23 |
| 2017/0244729 A1* | 8/2017 | Fahmy | ................. | H04L 63/0823 |
| 2018/0307833 A1* | 10/2018 | Noeth | ................... | H04L 43/062 |

* cited by examiner

*Primary Examiner* — Simon P Kanaan
(74) *Attorney, Agent, or Firm* — ArentFox Schiff LLP; Michael Fainberg

(57) ABSTRACT

Described herein are systems and methods for controlling access to a protected resource based on various criteria. In one exemplary aspect, a method comprises designating a plurality of program data installed on a computing system as protected program data; intercepting, by a kernel mode driver, a request from an untrusted application executing on the computing system to alter at least one of the protected program data; classifying, by a self-defense service, the untrusted application as a malicious application based on the intercepted request and information related to the untrusted application; and responsive to classifying the untrusted application as a malicious application, denying, by the kernel mode driver, access to the at least one of the protected program data.

20 Claims, 3 Drawing Sheets

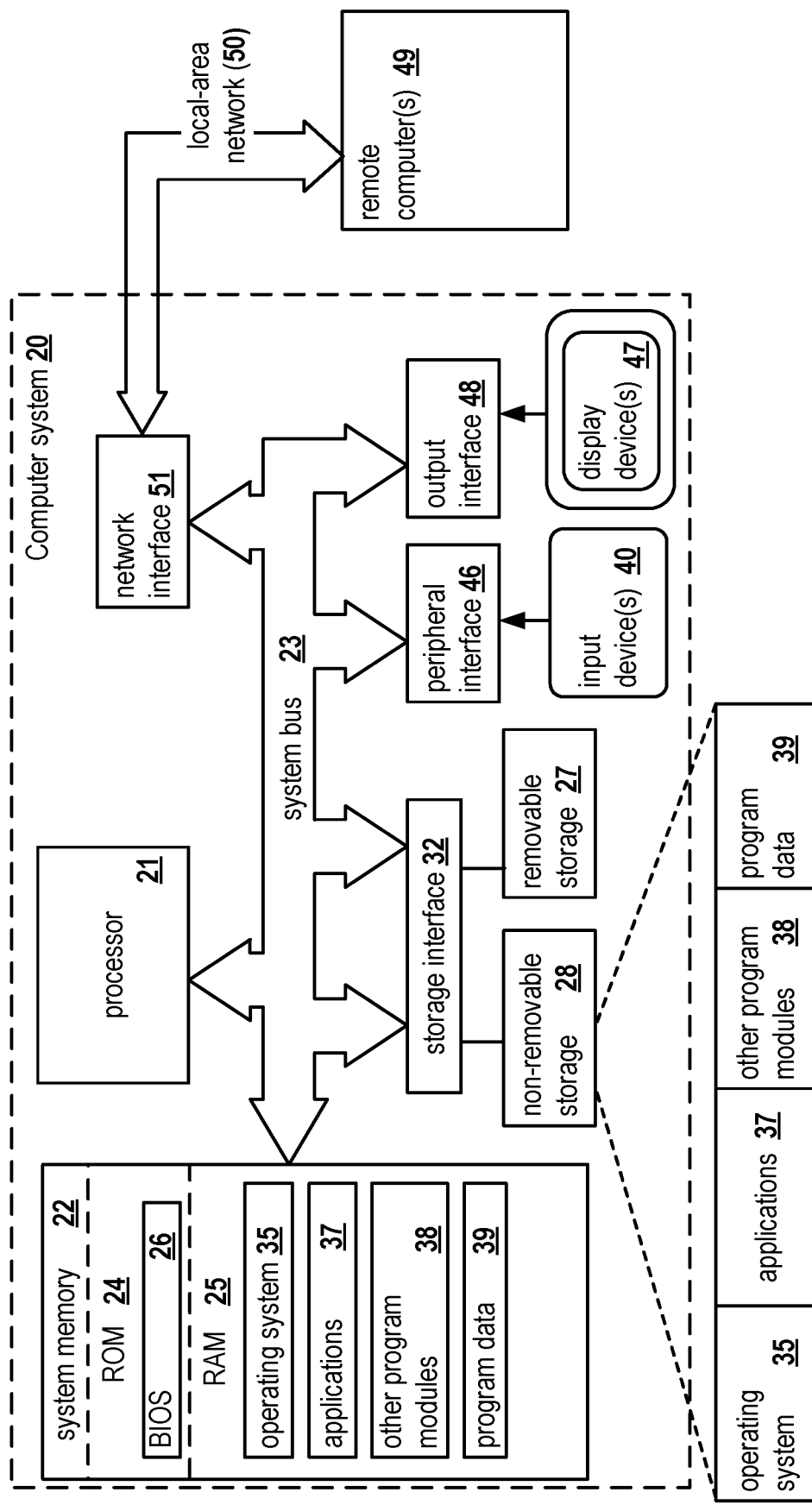

SELF-PROTECTION OF ANTI-MALWARE TOOL AND CRITICAL SYSTEM RESOURCES PROTECTION

CROSS-REFERENCE TO RELATED APPLICATIONS

This application claims benefit of priority to U.S. Provisional Patent Application No. 62/784,930 filed on Dec. 26, 2018, which is herein incorporated by reference in its entirety.

FIELD OF TECHNOLOGY

The present disclosure relates generally to the field of computer security, more specifically, to systems and methods of protecting anti-malware tools and other critical system resources from malware.

BACKGROUND

Malicious software, also referred to as "malware," can infiltrate or damage a computer system by corrupting software code, resulting in abnormal operation or even termination of applications and the operating system. Usually, malware can be recognized by analyzing the processes running on a system, and suspicious processes are recognized and blocked by security systems. However, conventional malware detection techniques have several drawbacks. Static analysis techniques involve scanning software code to identify suspicious commands and to compare the code with known characteristic properties of other viruses from an antivirus database. However, static analysis may be ineffective in situations where the active malware has been significantly modified or obfuscated from previous known versions, or in situations where the active malware has not been previously analyzed or even seen before, as is the case with zero-day attacks. Dynamic analysis techniques involve executing suspicious software code in a monitored, virtual environment, such as in a virtual machine. However, dynamic analysis techniques may be vulnerable to anti-emulation tricks embedded in the malware specifically designed to thwart analysis in the virtual environment. Examples of such anti-emulation tricks include the use of undocumented or uncommon Application Programming Interfaces (APIs), or the loading of a library for the operating system which is not emulated, which generally result in the failure of the emulator (e.g., virtual machine).

SUMMARY

Aspects of the disclosure describe systems and methods for controlling access to a protected resource based on various criteria. In one exemplary aspect, a method comprises designating a plurality of program data installed on a computing system as protected program data; intercepting, by a kernel mode driver, a request from an untrusted application executing on the computing system to alter at least one of the protected program data; classifying, by a self-defense service, the untrusted application as a malicious application based on information in the intercepted request and characteristics of the untrusted application; and responsive to classifying the untrusted application as a malicious application, denying, by the kernel mode driver, access to the at least one of the protected program data.

In some aspects, the method comprises allowing, by the kernel mode driver, execution of the request to the at least one of the protected program data responsive to classifying the untrusted application is not a malicious application.

In some aspects, the request to alter the at least one protected program data comprises a request to modify or delete the at least one of the protected program data.

In some aspects, the plurality of protected program data comprises at least one of program code and registry records for an anti-malware application.

In some aspects, the plurality of protected program data comprises a boot loader located in a master boot record of the computing system.

In some aspects, the plurality of protected program data comprises at least one of boot records, partition tables, and one or more system restore points.

In some aspects, classifying by the self-defense service the untrusted application as a malicious application further comprises applying one or more custom rules configured to describe behavior of the untrusted application.

In some aspects, classifying by the self-defense service the untrusted application as a malicious application further comprises applying one or more machine learning models configured to characterize a set of features of the untrusted application corresponding to a malicious application.

In some aspects, classifying by the self-defense service the untrusted application as a malicious application is performed based on one or more special registry keys.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 3 is a block diagram of a computer system on which the disclosed system and method can be implemented according to an exemplary aspect.

DETAILED DESCRIPTION

Exemplary aspects are described herein in the context of a system, method, and computer program product for controlling access to a protected resource based on various criteria. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Anti-malware tools have typically been used to protect user data on computing systems, such as documents, files. However, it has been determined that certain high-priority components of a computing system may also be the object of a virus or malware attack. Such high-priority components may include critical operating system resources, such as a master boot record, boot records, information about disk partitions (e.g., partition tables), shadow copies or Volume Snapshot Service (VS S) snapshots, or other low-level data objects. In another example, malware may also attack or attempt to disable any anti-virus, anti-malware, or computer security applications themselves, including executable and service program files, computing resources, and the address space of product processes thereof.

In some approaches, the computing system may be configured to protect these kinds of objects using a type of check on who performs or tries to perform a modifying action in the user system. Verification may be performed that is based on digital certificates and/or digital signatures that reveal to which vendor they belong. Such approaches can use a list of vendors (also referred to as a white list) who are allowed to modify the protected files, or the vendor has a digital signature that can be used to identify them and distinguish their requests from other requests.

Aspects of the present disclosure provide a system and method for identifying if a given application is malicious to control access, with the help of a special driver, to critical objects of the system and to the anti-malware program, by intercepting any attempts to modify these objects and attempts to remove these objects. The described technique for identifying that a given application is malicious can use, for the analysis of suspicious processes, a set of different methods, including behavioral analysis, models created based on machine learning, and any other data that allows the system to identify one process or another as malicious or safe/trusted.

Figure 1:
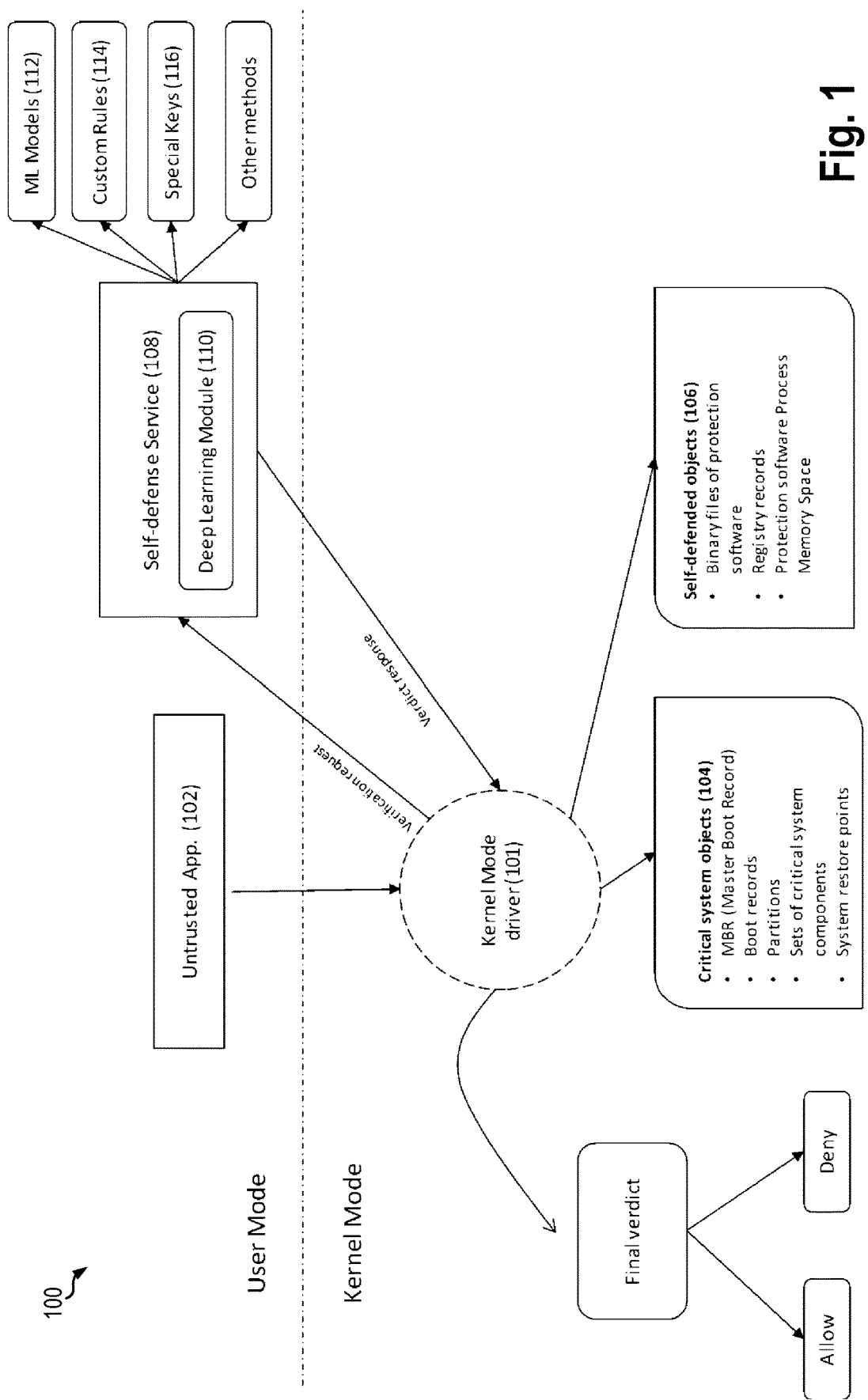
FIG. 1 is a block diagram illustrating a system for controlling access to a protected resource based on various criteria, according to an exemplary aspect.

FIG. 1 is a block diagram illustrating a computing system 100 for controlling access to a protected resource based on various criteria, according to an exemplary aspect. The system 100 supports execution of one or more user-level applications 102 in an operating system (OS) environment provided by an operating system (not shown). In some cases, the application 102 may in fact be a malicious application (e.g., malware, virus, rootkit, etc.) and is labelled in FIG. 1 as an "untrusted application". A malicious application is configured to infiltrate the operating system or damage the system 100 by corrupting software code, resulting in abnormal operation or termination of applications and the operating system, or unauthorized modification of user data on the system 100.

The system 100 may further include a security application configured to detect the execution or presence of malicious applications and/or malicious activity within the system 100. In some cases, to combat such computer security techniques, a malicious application may further be configured to corrupt software code and system data in a manner that affects the ability of the security application and the system 100 to detect or remove the malicious application. For example, the malicious application may seek to corrupt, modify, or delete program code (e.g., binary executables) of the security application, its corresponding registry records, and its application data within system memory. In another example, the malicious application may attempt to infect master boot record, boot records, partitions, system restore points, registry keys, process address space, threads, files, network connections of anti-malware or security software solutions, etc.

According to an aspect, the system 100 includes kernel mode driver 101 and a self-defense service 108 configured to prevent unauthorized access and/or modification of such critical system objects 104 and such data 106 of security application. The self-defense service 108 is so named due to its function of "self-defense" of the security application. Similarly, the data of the security application are referred to herein as self-protected objects 106. In an aspect, the self-defense service 108 may include a machine learning/deep learning module 110 configured to detect untrusted applications 102 as malicious applications using one or more machine learning models 112, custom rules 114 (e.g., YARA rules for malware detection), special keys 116, and other methods. Machine learning module 110 may be trained using a plurality of datasets (e.g., half classified as malicious and half classified as safe) that are labelled with explicit characteristics of the applications and the particular actions they perform on protected data. For example, if a set of characteristics are associated with maliciousness and an untrusted application has similar characteristics and actions, machine learning module 110 may extract said characteristics and information about the action and classify the untrusted application as malicious. For example, a process ID associated with a particular untrusted application may not be on a whitelist. Furthermore, the untrusted application's action may involve injecting code into protected data. Based on the presence of this characteristic and actions, respectively, machine learning module 110 may classify the untrusted application as malicious. In some aspects, the self-defense service 108 may be a component or software module that is part of the security application; and in alternative aspects, the self-defense service 108 may be an independent application or system service executing on the system 100.

In operation, an application 102 tries to get access to critical system objects 102 or to any objects 106 related to the security application. The application 102 tries to modify/delete or damage the objects listed. For example, the application may issue a disk write request to modify at least a portion of the master boot record (also referred to as a master partition table) containing a boot loader, so as to cause unauthorized program code (e.g., bootkit) to be loaded into the operating system kernel. An example bootkit may be configured to disable the security application before the security application even gets an opportunity to start as part of pre-defined startup procedure of the system 100. In another example, a malicious application may issue a disk write request to modify one or more system restore points of the operating system so as to insert unauthorized program code. System restore points contain information needed to restore the computing system to a chosen state. By inserting unauthorized program code into a system restore point, the malicious application is able to evade its removal through restoration to a prior system restore point because the unauthorized program code will nonetheless continue to exist.

In another example, a malicious application may issue a disk write request to corrupt executable program code of the security application, thereby preventing its execution, or configuration files of the security application or of the operating system itself (e.g., hosts file), thereby reducing its efficacy or ability to perform full scans. In another example, a malicious application may issue a memory access request to modify portions of system memory in which program code of the security application is stored or modify one or more registry keys of the security application, so as to crash its execution or prevent its proper execution.

The kernel mode driver 101 is configured to intercept the requests from the application 102 and send a verification request to the self-defense service 108. The verification request may include information about the access request itself (e.g., what data object is being targeted, what command, what parameters of the command). The verification request may include information about the application itself including characteristics such as process id, publisher information, location of application code, application code itself. In an aspect, the self-defense service 108 analyzes information about the access request and/or application 102 using one or more rules 114 (e.g., YARA rules) which describe the behavior of the software, one or more machine learning models 112 that can dynamically determine whether a set of features of the program under investigation (e.g., application 102) corresponds to dangerous or safe activity, one or more special registry keys 116, or some combination thereof. Special registry keys 116 may be for deleting or renaming files after rebooting the system. For example, "HKEY_LOCAL_MACHINE\SYSTEM\CurrentControlSet\Control\SessionManager" registry key contains "PendingFileRenameOperations" value that describes filenames pairs (source, destination). If destination filename is empty string the source file will be deleted on reboot.

In some aspects, the self-defense service 108 may be configured to apply different techniques in a complementary manner, i.e., if there is not enough data for one technique to make a determination, then another technique is applied, and so forth. For example, the self-defense service 108 may determine a confidence value proportional to the amount of data available for analysis (e.g., the size of a dataset) and assess whether the confidence value is at least a predetermined threshold size.

In some aspects, the data associated with the untrusted application may be assessed for size based on the number of characteristics that can be extracted from the untrusted application. For example, the self-defense service 108 may require 5 characteristics to make a proper classification with 100% confidence level. If only 2 characteristics can be extracted for the untrusted application, the confidence level may only be $\frac{2}{5}^{th}$ of the full value (e.g., 40%).

In some aspects, the data associated with the untrusted application may be time-based (e.g., to evaluate how the untrusted application behaves over time). If the time window associated with the available data is less than a threshold time window, self-defense service 108 may create false positives or may fail to detect a malicious application. For example, to make an assessment, an hour worth of data may be needed. However, only 30 minutes may be provided. Self-defense service 108 may have a 100% confidence level if an hour worth of data is provided, but may only have 50% if only 30 minutes is provided.

In some aspects, the self-defense service 108 may first attempt to analyze the behavior of the application 102 using the rules 114, and then use machine learning as a next step of the analysis. In terms of machine learning, the self-defense service 108 may use techniques such as data boosting (e.g., Adaboost) to extrapolate additional information for a dataset associated with a confidence value. In some aspects, only one analysis option is sufficient; and the following steps can be skipped so as to reduce the computing system resources utilized by the self-defense service 108.

After the self-defense service 108 renders a certain verdict, the self-defense service 108 transmits back to the kernel mode driver, a verification response indicating that verdict (e.g., allow, deny). In response to receiving the verification response, the kernel mode driver 101 makes the final decision, i.e., to allow access of this untrusted application 102 to the protected objects or reject (block) the access request of this untrusted application 102.

Figure 2:
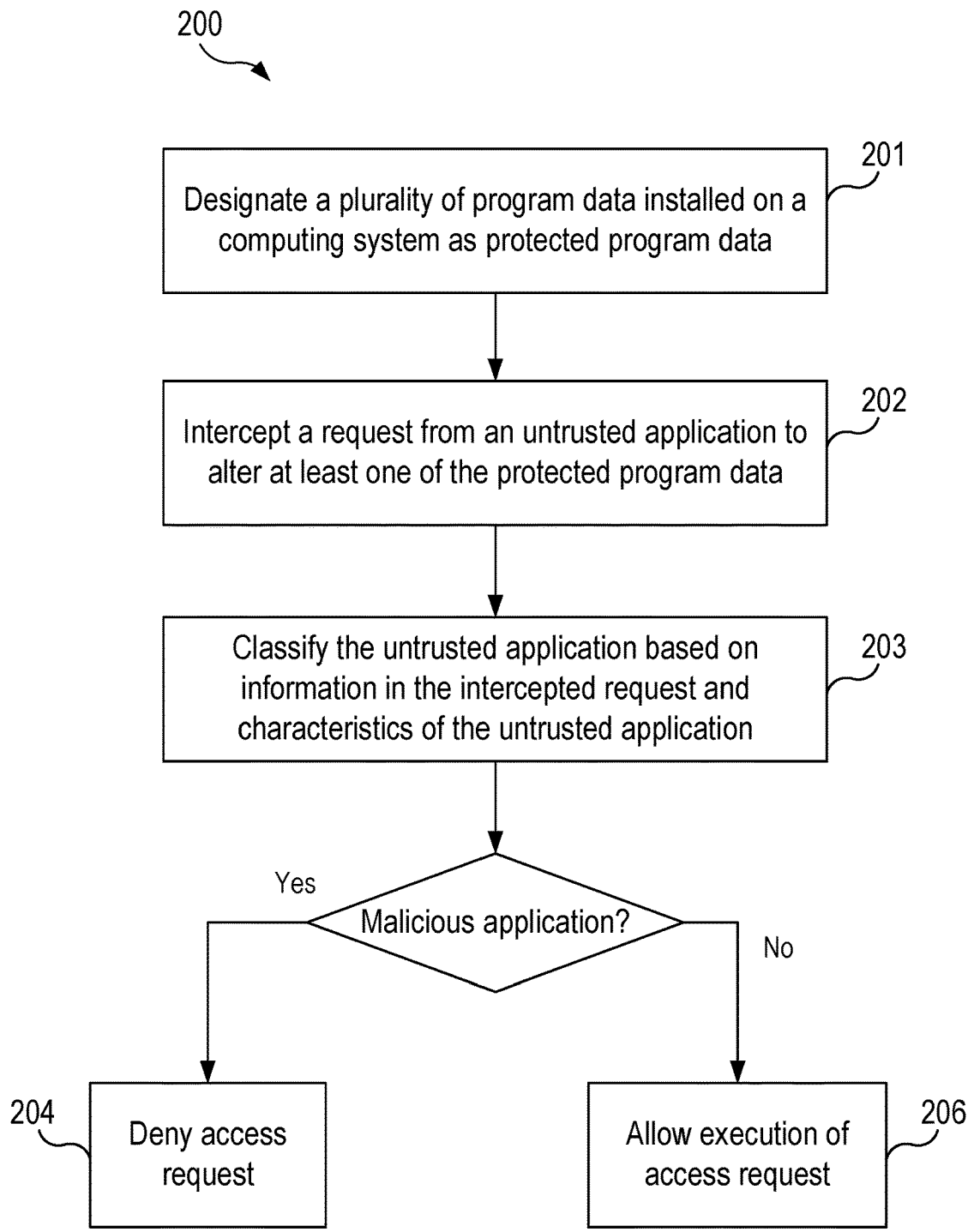
FIG. 2 is a flowchart illustrating a method for controlling access to a protected resource based on various criteria, according to an exemplary aspect.

FIG. 2 is a flowchart illustrating a method 200 for controlling access to a protected resources based on various criteria according to an exemplary aspect. It is noted that the following description of the exemplary method makes reference to the system and components described above. It is understood that the described technique can be extended to provide for program files protection, program registry protection, Master Boot Record protection, Volume Boot Record protection, partition layout protection, and other protected data objects.

The method 200 begins at step 201, wherein a plurality of program data installed on a computing system are designated as protected program data. In some aspects, the protected program data may be designated using an express listing of data objects stored in memory and on disk of the system 100. In other aspects, the protected program data may be dynamically designated according to association with a particular user application (e.g., threads or processes associated together having a particular process ID). In some aspects, the self-defense service 108 may dynamically determine the protected program data according to their location matching one of pre-determined locations in storage (e.g., file paths) where the security application is installed to (e.g., the anti-malware's known installation directory).

At step 202, the kernel mode driver 101 intercepts a request from an untrusted application executing on the computing system to alter at least one of the protected program data. In some aspects, the request to alter the at least one protected program data may include a request to modify or delete the at least one of the protected program data. In some aspects, the protected program data may include at least one of program code and registry records for an anti-virus, anti-malware, or other security application. The particular filtered requests may correspond to one of the specific types of protection described herein: files, registry values, MBR, VBR, etc. In some aspects, the protected program data may include a boot loader located in a master boot record of the computing system. In one implementation, the kernel mode driver 101 may intercept the request from the untrusted application that is a WRITE operation for the raw file system (e.g., physical disk). The kernel mode may also intercept SCSI pass-through commands of the required set, e.g., transmitted via a SCSI Pass Through Interface, which is an interface that ordinarily permits applications to send SCSI command descriptor block (CDB) messages to SCSI devices. In some aspects, the kernel mode driver may use one or more file system interceptors that are configured to intercept write operations, open/create file operations with destructive options, DELETE operations, rename operations with overwriting the target, or file system operations that set a symbolic link with replacing the target, and so forth. In some aspects, the protected program data may include at least one of boot records, partition tables, and one or more system restore points. In one implementation, for VSS snapshot protection, the special undocumented IOCTL is intercepted. In an aspect, the kernel mode driver may be configured to intercept requested changes to the system's registry using specific intercepted command sets.

At step 203, the self-defense service 108 classifies the untrusted application (e.g., as a malicious application or not) based on the intercepted request and information related to the untrusted application. In some aspects, the self-defense service 108 may classify the untrusted application by applying one or more custom rules configured to describe behavior (i.e., characteristics) of the untrusted application. In some aspects, the self-defense service 108 may classify the untrusted application by applying one or more machine learning models configured to characterize a set of features of the untrusted application corresponding to a malicious application. In some aspects, the self-defense service 108 may classify the untrusted application based on characteristics such as one or more special registry keys. In some aspects, the special registry keys specify settings for program auto start on operating system initialization, which can be used to copy a malware binary and enable auto start on that malware binary, and files renamed or deleted after system reboot.

At step 204, responsive to classifying the untrusted application as a malicious application, the kernel mode driver 101 denies access to the at least one of the protected program data. In some aspects, the kernel mode driver 101 may deny execution of the intercepted access request and raise an error or generate an event indicating an intercepted access request has been denied. Otherwise, at step 206, i.e., responsive to classifying the untrusted application is not a malicious application, the kernel mode driver 101 may allow execution of the request to the at least one of the protected program data.

FIG. 3 is a block diagram illustrating a computer system 20 on which aspects of systems and methods for controlling access to a protected resources based on various criteria may be implemented in accordance with an exemplary aspect. It should be noted that the computer system 20 can correspond to the system 100, for example, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, static random access memory (SRAM), dynamic random access memory (DRAM), zero capacitor RAM, twin transistor RAM, enhanced dynamic random access memory (eDRAM), extended data output random access memory (EDO RAM), double data rate random access memory (DDR RAM), electrically erasable programmable read-only memory (EEPROM), NRAM, resistive random access memory (RRAM), silicon-oxide-nitride-silicon (SONOS) based memory, phase-change random access memory (PRAM); flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 3, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for restricting access to protected resources, comprising:
    designating a plurality of program data installed on a computing system as protected program data, wherein the plurality of protected program data comprises a boot loader located in a master boot record of the computing system;
    intercepting, by a kernel mode driver associated with a security application, a request from an untrusted application executing on the computing system to alter at least one of the protected program data, wherein the request involves modifying the boot loader to enable a bootkit, which disables startup of the security application, to be loaded into an operating system kernel;
    classifying, by a self-defense service associated with the security application, the untrusted application as a malicious application based on information in the intercepted request and characteristics of the untrusted application; and responsive to classifying the untrusted application as a malicious application, denying, by the kernel mode driver, access to the at least one of the protected program data.

2. The method of claim 1, further comprising:
responsive to classifying the untrusted application is not a malicious application, allowing, by the kernel mode driver, execution of the request to the at least one of the protected program data.

3. The method of claim 1, wherein the request to alter the at least one protected program data comprises a request to modify or delete the at least one of the protected program data.

4. The method of claim 1, wherein the plurality of protected program data comprises at least one of program code and registry records for an anti-malware application.

5. The method of claim 1, wherein the plurality of protected program data comprises at least one of boot records, partition tables, and one or more system restore points.

6. The method of claim 1, wherein classifying by the self-defense service the untrusted application as a malicious application further comprises:
applying one or more custom rules configured to describe behavior of the untrusted application.

7. The method of claim 1, wherein classifying by the self-defense service the untrusted application as a malicious application further comprises:
applying one or more machine learning models configured to characterize a set of features of the untrusted application corresponding to a malicious application.

8. The method of claim 1, wherein classifying by the self-defense service the untrusted application as a malicious application is performed based on one or more special registry keys.

9. A system for restricting access to protected resources, the system comprising:
a processor configured to:
designate a plurality of program data installed on a computing system as protected program data, wherein the plurality of protected program data comprises a boot loader located in a master boot record of the computing system;
intercept, by a kernel mode driver associated with a security application, a request from an untrusted application executing on the computing system to alter at least one of the protected program data, wherein the request involves modifying the boot loader to enable a bootkit, which disables startup of the security application, to be loaded into an operating system kernel;
classify, by a self-defense service associated with the security application, the untrusted application as a malicious application based on information in the intercepted request and characteristics of the untrusted application; and
responsive to classifying the untrusted application as a malicious application, deny, by the kernel mode driver, access to the at least one of the protected program data.

10. The system of claim 9, wherein the processor is further configured to:
responsive to classifying the untrusted application is not a malicious application, allow, by the kernel mode driver, execution of the request to the at least one of the protected program data.

11. The system of claim 9, wherein the request to alter the at least one protected program data comprises a request to modify or delete the at least one of the protected program data.

12. The system of claim 9, wherein the plurality of protected program data comprises at least one of program code and registry records for an anti-malware application.

13. The system of claim 9, wherein the plurality of protected program data comprises at least one of boot records, partition tables, and one or more system restore points.

14. The system of claim 9, wherein the processor is further configured to classify, by the self-defense service, the untrusted application as a malicious application by:
applying one or more custom rules configured to describe behavior of the untrusted application.

15. The system of claim 9, wherein the processor is further configured to classify, by the self-defense service, the untrusted application as a malicious application further comprises:
applying one or more machine learning models configured to characterize a set of features of the untrusted application corresponding to a malicious application.

16. The system of claim 9, wherein the processor is further configured to classify, by the self-defense service, the untrusted application as a malicious application is performed based on one or more special registry keys.

17. A non-transitory computer readable medium storing thereon computer executable instructions for restricting access to protected resources, comprising instructions for:
designating a plurality of program data installed on a computing system as protected program data, wherein the plurality of protected program data comprises a boot loader located in a master boot record of the computing system;
intercepting, by a kernel mode driver associated with a security application, a request from an untrusted application executing on the computing system to alter at least one of the protected program data, wherein the request involves modifying the boot loader to enable a bootkit, which disables startup of the security application, to be loaded into an operating system kernel;
classifying, by a self-defense service associated with the security application, the untrusted application as a malicious application based on information in the intercepted request and characteristics of the untrusted application; and
responsive to classifying the untrusted application as a malicious application, denying, by the kernel mode driver, access to the at least one of the protected program data.

18. The non-transitory computer readable medium of claim 17, further comprising instructions for:
responsive to classifying the untrusted application is not a malicious application, allowing, by the kernel mode driver, execution of the request to the at least one of the protected program data.

19. The method of claim 1, wherein designating the plurality of program data installed on the computing system as the protected program data comprises identifying the protected program data in an installation directory of the security application in storage.

20. The system of claim 9, wherein designating the plurality of program data installed on the computing system as the protected program data comprises identifying the protected program data in an installation directory of the security application in storage.

* * * * *